Oct. 3, 1961  M. C. JAHN  3,002,471
CONTINUOUS STRIP DOUGH SHEETER
Filed Feb. 13, 1959  3 Sheets-Sheet 1

INVENTOR:
MARION C. JAHN
BY
ATT'YS

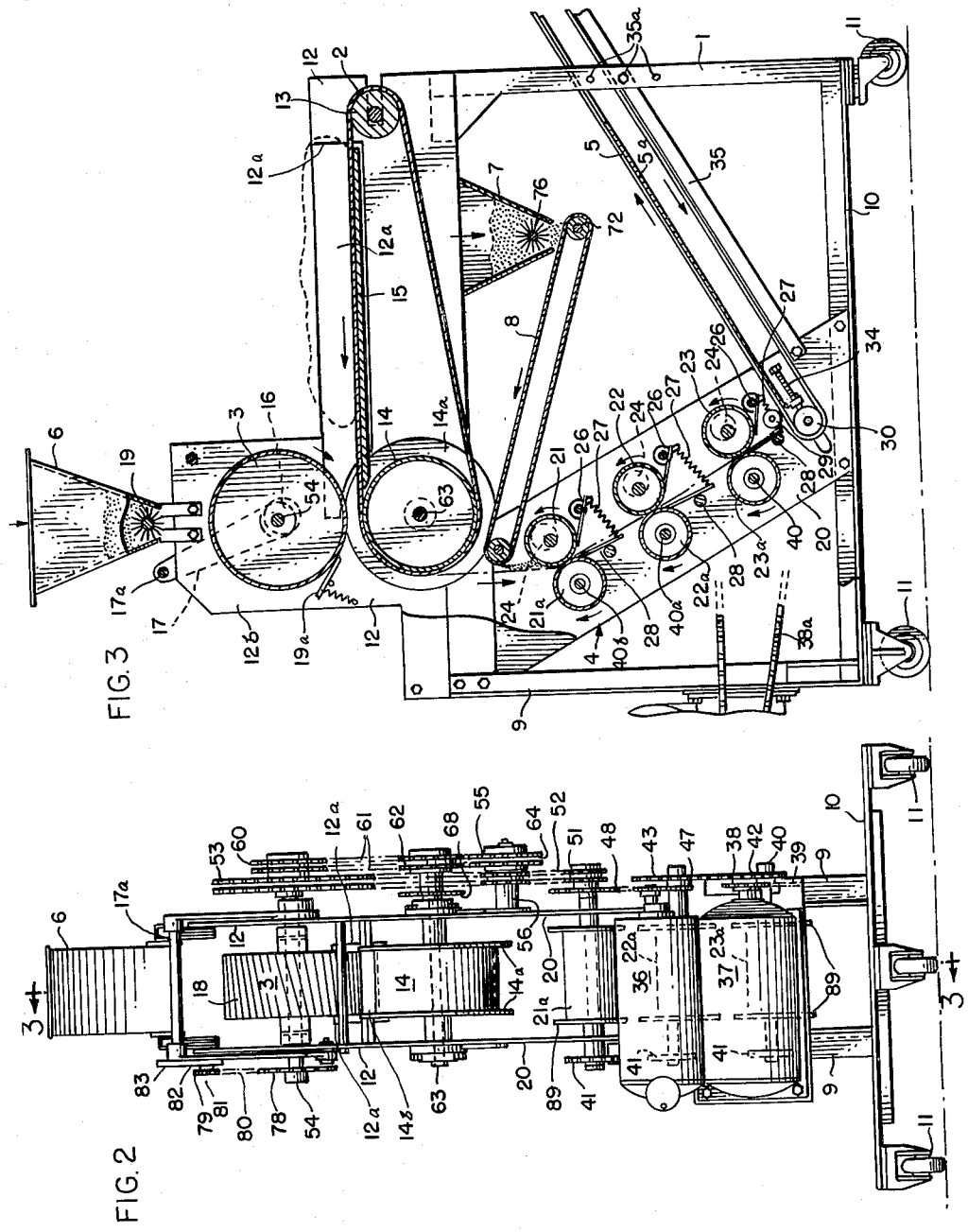

Oct. 3, 1961 M. C. JAHN 3,002,471
CONTINUOUS STRIP DOUGH SHEETER

Filed Feb. 13, 1959 3 Sheets-Sheet 3

INVENTOR:
MARION C. JAHN
BY
*Rummler & Snow*
ATT'YS

United States Patent Office 3,002,471
Patented Oct. 3, 1961

3,002,471
CONTINUOUS STRIP DOUGH SHEETER
Marion C. Jahn, Chicago, Ill., assignor to Colborne Manufacturing Company, Chicago, Ill., a corporation of Illinois
Filed Feb. 13, 1959, Ser. No. 793,183
6 Claims. (Cl. 107—12)

This invention relates to an improved apparatus for sheeting a continuous strip of pie dough. In particular, it relates to sheeting apparatus of the type employing in combination sets of rollers and belt conveyors to compress dough slabs into a continuous sheet, to flour both sides of the dough sheet and to deliver the sheet at a level for immediate use in other pie making equipment.

In the process of making finished prepared pies, the conventional steps include the preparation of the dough into dough slabs, making the dough slabs into floured sheets, and then delivering the dough sheets to appropriate pie making machinery.

Thus the step of sheeting and flouring the dough slab comes after the formation of the dough slab and before the use of the sheet to make a pie. However, both the succeeding and preceding steps necessitate either manual exertion or visual inspection and hence should be conducted on a working level which is convenient to the operator. Thus, a continuous strip pie dough sheeter must be able to receive dough slabs and to discharge the finished sheet at substantially the same working level as other pie making apparatus if the most efficient use of manual effort is to be obtained. Such a requirement, however, is conditioned by the further requirement that floor space and head room are at a premium and therefore must be minimized in the ordinary bakery establishment.

Therefore, it is an object of this invention to provide an improved continuous strip pie dough sheeter adapted to receive dough slabs at a conventional working level, to compress said dough slabs into a continuous sheet of pie dough having a predetermined width and thickness, and to deliver such a sheet at the conventional working level of successive pie making apparatus.

In order to produce a pie dough sheet which is workable and easily handled, a pie dough sheeter should also include means for thoroughly dusting both sides of the sheet with flour which serves to reduce the stickiness of the sheet and makes subsequent working of the sheet practicable.

Therefore, it is a further object of this invention to provide a continuous strip pie dough sheeter of the aforesaid type which includes improved means for flouring both sides of the dough sheet during the course of the sheeting operation.

Further, in providing a continuous strip pie dough sheeter which is capable of receiving dough slabs at a convenient level and delivering the finished sheet at substantially the same level, but with a minimum of floor space and head room for the sheeting mechanism, it is necessary to move the dough through a loop-like path as it is floured, progressively compressed, and finally delivered.

Thus, further objects of this invention are to provide an improved continuous strip dough sheeter which is extremely compact in construction; requires a minimum of floor space and head room; which is relatively simple and economical to manufacture and to keep in a state of repair; and which will deliver a continuous, finished sheet of dough to a point substantially adjacent the place where the initial dough slab is introduced into the sheeter apparatus.

A specific embodiment is shown in the accompanying drawings in which:

FIG. 2 is an end elevational view of the embodiment shown in FIGURE 1, but with certain of the frame members broken away to better show the sheeting rolls and drive arrangement.

Figure 4:
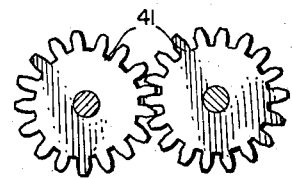
Figure 5:
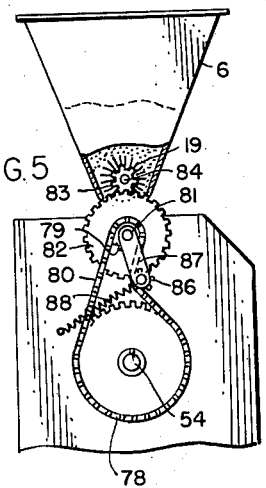
Figure 6:
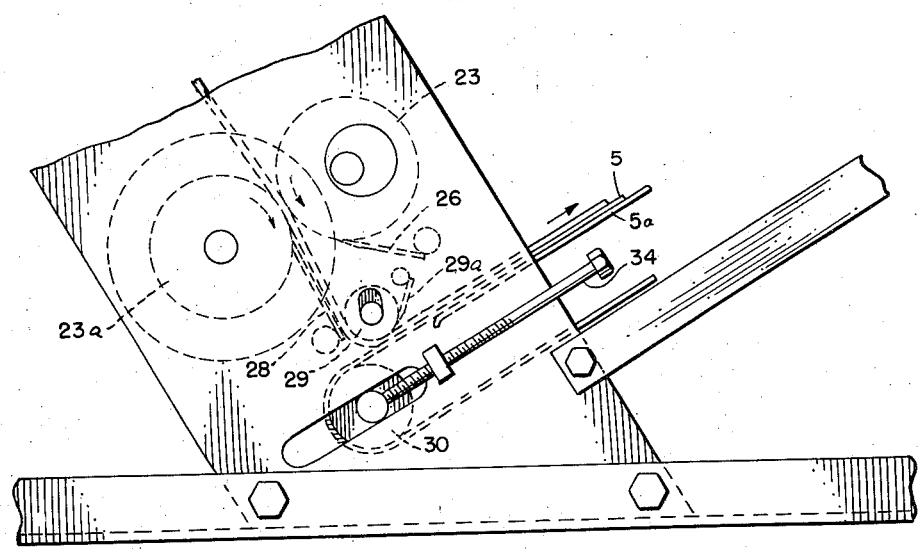

FIG. 3 is a sectional view of the embodiment shown in FIGURE 2 taken substantially on the plane of line 3—3, FIG. 4 is a fragmentary view illustrating the driving interconnection for companion pairs of the sheeting rolls, FIG. 5 is a fragmentary detail of the flour dusting means showing the drive therefor, and FIG. 6 is a detail view showing the arrangement for transferring the finished dough sheet onto the delivery conveyor.

The continuous strip pie dough sheeter shown in the drawings is comprised generally of a rectangular skeleton frame 1, an upper conveyor comprising an endless belt 2, a pressure roller 3, a plurality of diagonally aligned sheeting and finishing roller pairs 4, a lower delivery conveyor comprising an endless belt 5, an upper flour hopper 6, a lower flour hopper 7, and an intermediate flour dusting belt 8.

The frame 1 is comprised of two rectangular side portions 9 secured to a suitable base member 10 adapted to be moved about on casters 11 secured thereto. Frame side portions 9 are appropriately secured together by means of transverse brace members (not shown) located between the upper portions of the side members. Secured to each side member is an upper side-plate 12 for supporting the upper conveyor belt 2, the upper roller 3 and the upper flour hopper 6. These upper side-plates 12 are formed to extend above conveyor belt 2 on either side and between them are a pair of parallel plates 12a extending along each side of the belt 2 to provide upstanding side walls for confining the dough to the surface of the conveyor belt 2.

Conveyor belt 2 is adapted to be driven between first and second support rollers, 13 and 14 respectively, which are journaled for rotation on the vertical support plates 12. The diameter of roller 14 at the forward end of this conveyor is significantly greater than that of roller 13 at the rearward end, each of these rollers being disposed in a manner to cause the upper surface of conveyor belt 2 to be substantially horizontal. A horizontal supporting and guiding member 15 (FIG. 3), which is generally rectangular in shape, and is located beneath the upper run of the conveyor belt 2, extends substantially between the two rollers 13 and 14, and is suitable secured to the side plate members 12a. The purpose of this horizontal support member 15 is to support the dough load carried by the upper surface of the conveyor belt 2 and to cause the belt to travel substantially horizontally even when relatively heavy dough slabs are placed on it.

As best shown in FIGURE 3 the upper run of conveyor belt 2 is adapted to travel from the smaller roller 13 toward the larger roller 14 when the sheeter is in operation. An adjusting means indicated at 13a (FIG. 1) may be used with roller 13 to assure keeping conveyor belt 2 taut. Pressure roller 3 is rotatably mounted on the vertical arm portions 12b of side-plates 12. More specifically, roller 3 is journaled eccentrically in cylindrical cam devices 16 rotatably mounted on each upper support member 12. An operating arm 17 is secured to each cam device 16 and is adapted to rotate cam 16 to adjust the space between the lower surface of roller 3 and the upper surface of conveyor belt 2. A cross bar 17a is secured to the outer end of each arm 17 to assure parallel movement of both ends of the roller 3. Appropriate means such as bolts and wing nuts 17b operating in suitable slots in the supports 12 may be provided to secure the arms 17 in each selected position. This spacing primarily controls the degree of compression or initial sheet thickness which will be effected by the upper roller when the dough slab is moved by the upper surface of conveyor belt 2 beneath roller 3. In the form shown, the pressure roller 3 is a fluted surface roller formed with circumferentially spaced grooves 18 extending in the axial direction across the surface of the roller, the grooves being disposed at an angle of about 15 degrees to the roller axis. At this point it should be noted that conveyor roller 14 is provided with end flanges 14a which overlap the ends of the roller 3 and thus provide a closed channel 14b (FIG. 2) which determines the width of the dough sheet formed from the slab.

An upper flour hopper 6 is secured to the sideplate arm members 12b and is tapered downwardly and appropriately formed to sprinkle flour over the top surface of the upper roller 3. Rotary brush means 19 may be provided in the upper hopper to agitate the flour to insure the proper flow of flour onto the upper surface of roller 3. The flour is received on the surface of the upper roller 3 which then coats the flour onto the adjacent surface of the dough sheet as it is formed by the roller and belt.

A doctor or scraper blade 19a may be appropriately positioned adjacent the pressure roller 3 to assure that as the dough sheet emerges from between the pressure roller and the conveyor belt it will not stick to the surface of upper roller 3 but rather will follow the surface of conveyor belt 2 until it is pulled substantially vertically downwardly by gravity and subsequently by the pull of the roller system 4. It is to be noted that the conveyor belt 2 is predusted with flour in a conventional manner not shown. This dusting of the conveyor belt surface, however, does not work the flour into the under side of the dough but merely serves to assure that the dough will not stick to the conveyor as it is compressed against the conveyor belt surface but rather will freely leave the conveyor belt as the belt completes its passage around the horizontal extremity of roller 14.

Each frame side 9 has secured thereto a diagonally disposed frame plate 20 which not only increases the strength of the frame sides 9 but also serves to support the plurality of pairs of sheeting and finishing rollers 4. These pairs of rollers are comprised of an upper pair 21—21a, an intermediate pair 22—22a, and a lower pair 23—23a. Each pair of rollers in turn is comprised of two substantially identically sized rollers having substantially parallel axis, the axis of the right-hand roller of each pair (FIG. 3) being disposed somewhat above the axis of the other roller of the pair so that a line drawn between the two center lines of the axis of the rollers would be in a plane inclined upwardly from the horizontal. Thus the path between successive pairs of rollers is inclined downwardly and to the right, as shown in FIG. 3, or in the reverse direction from the travel of the upper run of the conveyor belt 2.

The space 14b between the upper roller 3 and the upper surface of conveyor belt 2 is relatively great so that the compressing action of the pressure roller 3 on the dough slab results in the formation of a substantially thick sheet of dough. However, the space between the upper rollers 21—21a is normally such as to compress the sheet of dough to about one-half of that necessary to form the thickness of the final sheet; and the spaces between intermediate rollers 22—22a and the lower rollers 23—23a are such as to further compress the sheet to its final desired thickness.

The aforesaid spaces between the upper, intermediate, and lower rollers of the roller system 4 thus define a substantially diagonally-disposed dough passage which is inclined downwardly and rearwardly relative to the direction of movement of the upper run of conveyor belt 2. As shown, the space between the upper rollers 21—21a is disposed vertically beneath the horizontal extremity of the conveyor belt 2 as it passes around roller 14 so that when the dough sheet passes vertically downwardly upon leaving the belt 2 it will enter between rollers 21—21a to be further compressed. Thus, as shown, the dough sheet is moved through an angle of approximately 120 degrees as it leaves the upper conveyor belt 2 and travels between the successive roller pairs.

Further, one roller of each pair is preferably journaled in an eccentric cam device 24 such as that described in regard to upper roller 3. Each of these eccentric cam devices 24 is adapted to be adjusted by means of a lever arm 25 in the same manner previously described in regard to lever arm 17, so that the space between the pairs of rollers may be varied in the usual manner in accordance with the type and consistency of the dough and the required thickness of the final sheet product.

Conventional doctor blades 26 are respectively urged into contact with the upper roller of each pair by springs 27 to assure that the dough sheet will be freed from the surface of the roller; and respective ones of these doctor blades 26 are connected by the springs 27 with doctor blades 28 which are adapted to scrape the lower rollers of the upper and intermediate pairs and are further formed with an extended supporting surface to guide the sheet downwardly, diagonally, toward the next pair of rollers. The lowermost doctor blades 26 and 28 for the rollers of the bottom pair are also urged into contact with the respective rollers by suitable springs, not shown, and between these blades is a guide roller 29, as shown in detail in FIG. 6, beneath which the dough sheet passes to engage the conveyor belt 5. This roller 29 is also provided with a doctor blade 29a and functions to smooth out any ripples in the dough sheet and to keep the sheet aligned with the conveyor 5.

Conveyor belt 5 is adapted to be driven between and over four rollers 30, 31, 32 and 33. The axis of the lower roller 30 is located below the guide roller 29, while the upper rollers 31 and 32 (FIG. 1) are disposed with their axes in a substantially horizontal plane and spaced rearwardly from but substantially at the height of the upper surface of conveyor belt 2. Thus the upper run of conveyor belt 5 is adapted to travel upwardly and then to terminate in a substantially horizontal section moving in a direction opposite to the direction of movement of the upper run of conveyor belt 2. Lower roller 30 may be slidably journaled in the side plates 20, and provided with adjusting means 34 for tightening the conveyor belt 5. Roller 33 serves to constrain the lower run of belt 5 to move substantially parallel with the upper run for a substantial portion of the inclined height. Upper rollers 31, 32 and 33 are shown journaled within the supporting arms 35 pivoted at their lower ends to the side plates 20 and secured intermediate their ends to the frame 1. As shown, the apparatus may include means 35a for vertically adjusting the outer ends of arms 35 to deliver the finished dough sheet at various heights within the convenient range of other pie making apparatus. In the arrangement shown the conveyor 5 is driven by means of a sprocket 32a suitably connected by means not shown, with the pie making machine, also not shown, to which the dough sheet is delivered, the sprocket 32a being fast on the shaft of the outermost roller 32. Also as shown, the top run of the conveyor 5 is supported against sagging by means of a plate 5a suitably supported from the arms 35.

As shown, the rollers and the conveyor belts 2 and 8 may be driven as by means of a motor 36 through an appropriately connected variable speed mechanism 37. (Means for connecting the motor and variable speed mechanism is not shown.)

A sprocket 38 is secured for rotation with the output shaft of the variable speed device 37 and in turn is connected by a chain or belt 38a to a sprocket 39 secured for rotation with lower outer roller shaft 40 which mounts and drives the lower outer roller 23a. The inner lower roller 23 is connected to the outer lower roller for rotation at the same rate in the opposite direction. Means for accomplishing this mutual rotation of the two rollers of each pair in the roller series 4 is shown in FIG. 4 of the drawings, and as shown includes two equal sized long-toothed sprockets 41 on the opposite ends of the respective roller shafts 24 and 40. These sprockets, located on the opposite side of the machine from the primary drives, permit radial adjustment of one roller relative to the other.

As shown in FIG. 2, a second sprocket 42 is also mounted on lower outer roller shaft 40 and an intermediate sprocket 43 is secured to the shaft 40a of the outer intermediate roller 22a. These sprockets 42 and 43 are connected by a chain 44 which runs over a shiftable idler sprocket 45 actuated by a spring 46 to keep the chain taut. Similarly a second sprocket 47 is secured on the roller shaft 40a inside the sprocket 43 and a larger upper sprocket 48 is secured on the upper outer roller shaft 40b. A chain 49 engaging sprockets 47 and 48 drives the upper rollers 21a at a much slower rate of speed than that of intermediate rollers 22a. The chain 49 also rides over a shiftable tensioning idler 50 which operates the same as the idler 45.

A second upper sprocket 51 is also secured on the roller shaft 40b and this sprocket 51 is adapted to drive the pressure roller 3, the upper conveyor belt 2 and the intermediate conveyor belt 8 as set forth hereafter.

As shown, sprocket 51 is connected by means of chain 52 to drive a pressure-roller sprocket 53 which has a diameter considerably larger than that of the second upper sprocket 51 and which is secured to pressure roller shaft 54 whereby roller 3 is driven at a much slower rate of speed than that of the upper rollers 21—21a. The chain 52 passes over an idler sprocket 55 which is mounted for free rotation on a stub shaft 56 and is so arranged for the purpose of spacing the chain outwardly to provide room for other parts of the mechanism. Also a second idler sprocket 57 is pivotally mounted on upper support 12 by means of an arm 58 and is urged into engagement with chain 52 by means of a spring 59 to maintain the chain 52 in a taut condition regardless of how the pressure roller 3 is adjusted by its eccentric cam means 16.

A second pressure roller sprocket 60 is secured to the shaft 54 and is connected by a chain 61 to drive a sprocket 62 which is mounted on the shaft 63 of the conveyor roller 14. The chain 61 passes around an idler sprocket 64 secured for free rotation on the stub shaft 56 before outwardly engaging the sprocket 62 so as to impart proper direction to the conveyor 2. Chain 61 is tensioned by idler roller 65 swingably secured to upper support member 12 by means of pivoted arm 66 which is actuated by means fo spring 67 to keep the chain 61 taut. It is to be noted that the diameter of upper conveyor roller sprocket 62 and that of second pressure roller sprocket 60 are substantially equal so that pressure roller 3 and the upper surface of conveyor belt 2 will be driven at substantially the same lineal speed.

At this point it should be noted that the drive sprockets 51, 53, 60 and 62, and the associated idlers 55, 57, 64 and 65 are all double sprockets, the reason being that the load they must sustain is greatly increased because of their relatively low speed compared to the drive for the roller system 4.

Figure 1:
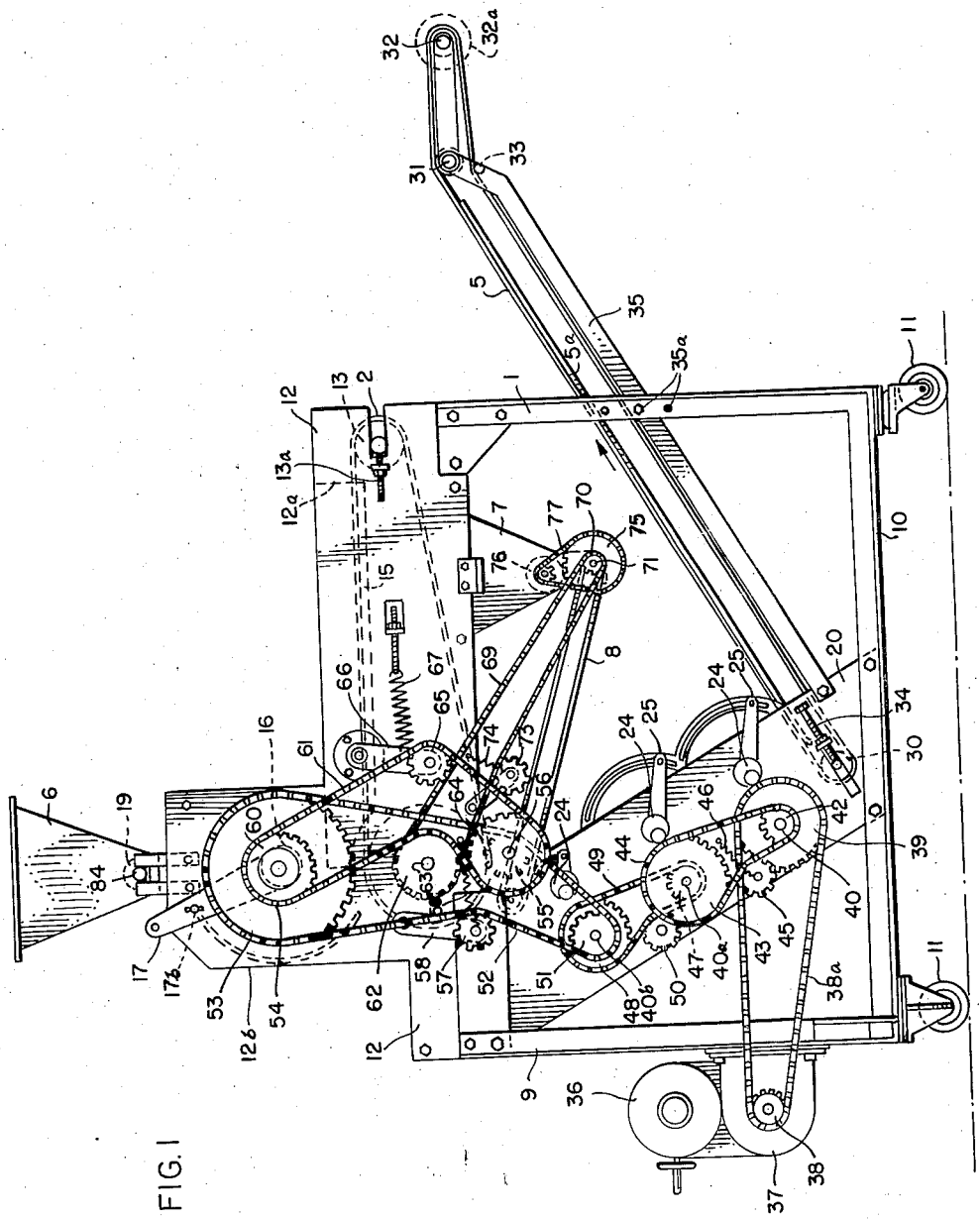
FIGURE 1 is a side elevational view of a continuous strip pie dough sheeter constructed in accordance with this invention.

A single sprocket 68 is mounted for rotation with shaft 63 (FIG. 2) and is adapted to drive a chain 69 which engages a sprocket 70 secured to drive the shaft 71 of the drive roller 72 of the intermediate conveyor belt 8. Chain 69 is held in taut condition by means of an idler sprocket 73 pivotally mounted with respect to upper support member 12 by means of an arm and spring arrangement 74. Also, as shown in FIG. 1, a second sprocket 75 is secured to the intermediate conveyor belt drive roller shaft 71 and is arranged to drive a flour agitating means 76, in the dusting hopper 7, through a chain 77 and an appropriate sprocket attached to the agitator shaft.

As viewed in FIGURES 2 and 5, the flour duster 6 for the pressure roller 3 is driven from a sprocket 78 secured to the outer end of the pressure roller shaft 54 and connected to drive a sprocket 79 by means of a chain 80. The sprocket 79 is mounted on stub shaft 81 having a gear 82 meshed with a pinion 83 mounted on an agitator shaft 84 which carries a brush agitator 85. The chain 80 is also tensioned by sprocket 86 on a pivoted arm 87 actuated by a spring 88.

In operation, the continuous strip dough sheeter is placed at the entering end of a pie making machine and the conveyor 5 is connected to be driven thereby. The upper surface of the upper conveyor 2 is dusted with flour and prepared dough slabs are placed manually on the conveyor 2 between the conveyor side plates 12a. Due to the convenient height of the conveyor 2 the dough slabs may be manually placed on the conveyor by an operator standing on the bakery floor. The conveyor belt 2 then carries the dough slabs into contact with the fluted pressure roller 3 and as the conveyor belt 2 continues to move from right to left as viewed in FIGURE 3, the rotation of the pressure roller 3 compresses the dough slab against the conveyor belt on the roller 14 to form a fairly thick sheet of dough of uniform dimensions, the flour sprinkled onto roller 3 by duster hopper 6 being simultaneously coated into the upper surface of the dough sheet as it passes beneath the roller. As the dough sheet emerges from beneath roller 3 it follows the contour presented by roller 14, upper doctor blades 19a assuring that the dough sheet will not adhere to the pressure roller. As the strip is moved to the outer horizontal extremity of conveyor belt 2 the weight of the sheet causes it to move verically downwardly where it is received in the space between the two upper finishing rollers 21—21a for further compression. Flour hopper 7 acts continuously to deposit an even coating of flour on the upper surface of the intermediate conveyor 8 which conveys this coating forwardly where it is deposited on the reverse side of the dough sheet as it passes by the end of the conveyor and also onto the surface of the inner upper roller 21 which coats this flour onto the reverse side of the dough sheet.

It is to be noted that the roller 14 is provided with extending flanges 14a at each end which overlap the ends of the roller 3 and serve to insure that the compression of the dough slab will result in a predetermined uniform width of dough sheeting. Thus, as the dough is compressed by upper roller 3 the dough slab is considerably elongated which necessitates that the speed of the upper roller pair 21—21a be significantly greater than that of pressure roller 3 so as to accommodate the elongated strip of dough. As the dough sheet passes between the upper roller pair 21—21a the dough is further compressed a substantial amount, upper roller 21a being provided with end flanges 89 which overlap the ends of the companion roller to assure the formation of a dough strip of uniform predetermined width. Scraper blades 26 and 28 assure that the dough sheet will not adhere to the surfaces of the rollers and the elongated rear portion of the outer scraper blades 28 assures that the sheet will move in a proper diagonal path for reception between the intermediate roller pair 22—22a. Intermediate roller pair 22—22a further compress the dough sheet and delivers the sheet into the space between lower rollers 23—23a which compress the sheet to its final predetermined thickness for delivery to the conveyor 5.

Upon leaving the lowermost finishing rolls the dough sheet passes beneath the guide roller 29 and onto the conveyor belt 5, the guide roller 29, at this point, serving to smooth out any ripples that may appear in the sheet as it is laid onto the conveyor and also keep the sheet or strip of dough in properly centered alignment on the conveyor for ultimate delivery upwardly to the level of the pipe making machine where the dough sheet is discharged onto the pie machine conveyor not shown. The speed of sheet delivery to the conveyor 5 is readily regulated to conform with the speed of the pie making machine, and hence the speed of the conveyor 5, by manual adjustment of the variable speed drive mechanism 37. It is to be noted that at this point that the dough sheet is traveling in the opposite direction from the direction of the entering dough slab and at substantially the same level as the upper surface of conveyor belt 2; namely, at the conventional working height of other pie making equipment so that the floured continuous dough sheet may be deposited directly on other pie making apparatus for immediate processing and without intermediate handling.

The main advantages of this invention reside in the efficient utilization of space resulting from the unique arrangement of the elements of the continuous dough sheeter in a single operating unit which is adapted to receive dough slabs at a convenient working level and which delivers the finished sheet at the conventional working level of subsequent processing machinery. Other advantages are found in the specific loop arrangement which conserves floor space and head room; and in the utilization of particular elements which permits a compact unit and which includes means for adjusting the various dimensions of the various compression rollers to assure the continuous delivery of uniformly floured sheets of predetermined thickness and width. Still further advantages are to be found in the floating roller arrangement at the point of delivery of the finished sheet to the upwardly angulated conveyor whereby any surface imperfections in the sheet are removed; and in the unique arrangement for delivering an ample quantity of dusting flour onto the bottom side of the initially formed sheet just prior to its entry into the finishing roll series.

Although but one specific embodiment of this invention is herein shown and described it will be understood that the details of the construction shown may be altered or omitted without departing from the spirit of this invention as defined by the following claims:

I claim:

1. A dough sheeting machine comprising a first endless-belt conveyor for moving a mass of dough horizontally in one direction between forward and rearward conveyor rollers defining the respective ends of the conveyor, means for compressing said dough mass on said first conveyor as the mass is moved thereby to form a dough sheet for delivery over the forward end of the said conveyor, a series of successive pairs of finishing rollers extending downwardly and rearwardly from the forward end of the first conveyor for receiving said dough sheet from the first conveyor and further reducing its thickness progressively, the rollers of each pair being horizontally spaced and adapted to receive the dough sheet between them, means directly beneath the first conveyor for applying a coating of flour onto the surface of said sheet next adjacent the first conveyor prior to the entry of the sheet into said series of finishing rollers, and a delivery conveyor means for receiving the dough sheet from the lowermost pair of rollers of said series and conveying the sheet upwardly and rearwardly of the first conveyor to substantially the height thereof.

2. A dough sheeting machine according to claim 1 wherein the means for applying a coating of flour onto the said surface of the dough sheet comprises a second endless-belt conveyor extending lengthwise of the first conveyor and running in the same direction, said second conveyor having its delivery end disposed adjacent the path of the dough sheet between the forward end of the first conveyor and the uppermost roller pair of said series, and means adjacent the rearward end of said second conveyor for depositing flour at a substantially uniform rate onto the upper surface of said second conveyor.

3. A dough sheeting machine according to claim 1 wherein the rollers of each pair of finishing rollers in said series are journaled on axes parallel with the axis of the first conveyor rollers and lying in a respective plane inclined forwardly and downwardly from the plane of the dough carrying surface of the first conveyor.

4. A dough sheeting machine according to claim 1 wherein the series of finishing rollers comprising three pairs of rollers, the rollers of each pair are journaled on axes parallel with the axes of the first conveyor rollers and lying in a respective plane inclined forwardly and downwardly from the plane of the dough carrying surface of the first conveyor, the planes of the axes of the successive pairs of finishing rollers being parallel, and the series of finishing rollers extends along a single plane normal to the said parallel planes.

5. A dough sheeting machine according to claim 4 including a horizontal guide roller mounted parallel with the said single plane of said series of finishing rollers and disposed to peripherally engage the uppermost surface of the dough sheet as it travels between the said lowermost pair of finishing rollers and the said delivery conveyor, said guide roller being journaled for limited vertical movement so as to rest gravitationally against the said dough sheet.

6. In a dough sheeting machine comprising a first endless-belt conveyor having an upper surface adapted to transport a mass of dough in a forward direction beneath a compression roller mounted above said conveyor for forming a substantially continuous dough sheet of predetermined width on said surface for delivery over the forward end of said conveyor, a series of vertically spaced pairs of finishing rollers extending downwardly from the forward end of said first conveyor, the rollers of each pair of said series being journaled on horizontally spaced axes extending parallel with the plane of the upper surface of said first conveyor and transversely of the direction of travel of said surface, said series of pairs of finishing rollers being disposed to receive the dough sheet from the forward end of said first conveyor and to deliver said sheet downwardly from the lowermost pair of finishing rollers, a delivery conveyor extending in the lengthwise direction of the first conveyor and disposed to receive the dough sheet delivered from said lowermost finishing rollers, and a guide roller disposed between said lowermost finishing rollers and the delivery conveyor for engagement with the uppermost surface of the dough sheet while the sheet passes between said finishing roller and the delivery conveyor, said guide roller having its axis parallel with the axes of the finishing rollers and being journaled for limited vertical movement so as to rest gravitationally against the dough sheet.

References Cited in the file of this patent

UNITED STATES PATENTS

| Re. 22,399 | Fonken | Dec. 7, 1943 |
|---|---|---|
| 752,119 | Stearns | Feb. 16, 1904 |
| 987,231 | Hultin | Mar. 21, 1911 |
| 1,700,303 | Bauer | Jan. 29, 1929 |
| 1,868,317 | Green et al. | July 19, 1932 |
| 1,945,755 | Scruggs | Feb. 6, 1934 |
| 2,672,829 | Rice | Mar. 23, 1954 |
| 2,691,351 | Turner | Oct. 12, 1954 |
| 2,746,401 | Archer | May 22, 1956 |
| 2,869,483 | Naylor | Jan. 20, 1959 |

FOREIGN PATENTS

| 32,800 | Sweden | May 15, 1912 |